(12) United States Patent
Groom et al.

(10) Patent No.: US 6,578,597 B2
(45) Date of Patent: Jun. 17, 2003

(54) FUEL TANK VENT SYSTEM WITH LIQUID FUEL FILTER

(75) Inventors: J Bradley Groom, Oxford, OH (US); Dennis M. DeCapua, Greenfield, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/094,058

(22) Filed: Mar. 8, 2002

(65) Prior Publication Data

US 2002/0124909 A1 Sep. 12, 2002

Related U.S. Application Data

(60) Provisional application No. 60/274,334, filed on Mar. 8, 2001.

(51) Int. Cl.[7] .............................................. F16K 17/00
(52) U.S. Cl. ..................... 137/43; 137/202; 137/493; 137/587; 141/44; 141/46; 141/59; 141/198; 141/303
(58) Field of Search ........................ 137/43, 202, 493, 137/587; 141/44–46, 59, 198, 303

(56) References Cited

U.S. PATENT DOCUMENTS 6,311,675 B2 * 11/2001 Crary et al. ................. 123/516

* cited by examiner

Primary Examiner—J. Casimer Jacyna
(74) Attorney, Agent, or Firm—Barnes & Thornburg

(57) ABSTRACT

A vent module is adapted to be mounted in a top wall of a fuel tank to vent fuel vapor from the tank to a vapor recovery canister located outside the tank. An outer shell is positioned around the vent module to define a fuel vapor transfer passageway arranged to conduct liquid fuel droplets into a liquid fuel accumulation chamber. A fuel vapor transfer port is formed in the outer shell to admit fuel vapor into the fuel vapor transfer passageway. A fuel vapor inlet port is formed in the vent module to lie below the fuel vapor transfer port. Liquid fuel entrained in fuel vapor is shed as fuel vapor flows laterally from the fuel vapor transfer passageway into the vent module through the fuel vapor inlet port so that "demoisturized" fuel vapor flows into the vent module and liquid fuel droplets fall into the liquid fuel accumulation chamber.

23 Claims, 9 Drawing Sheets

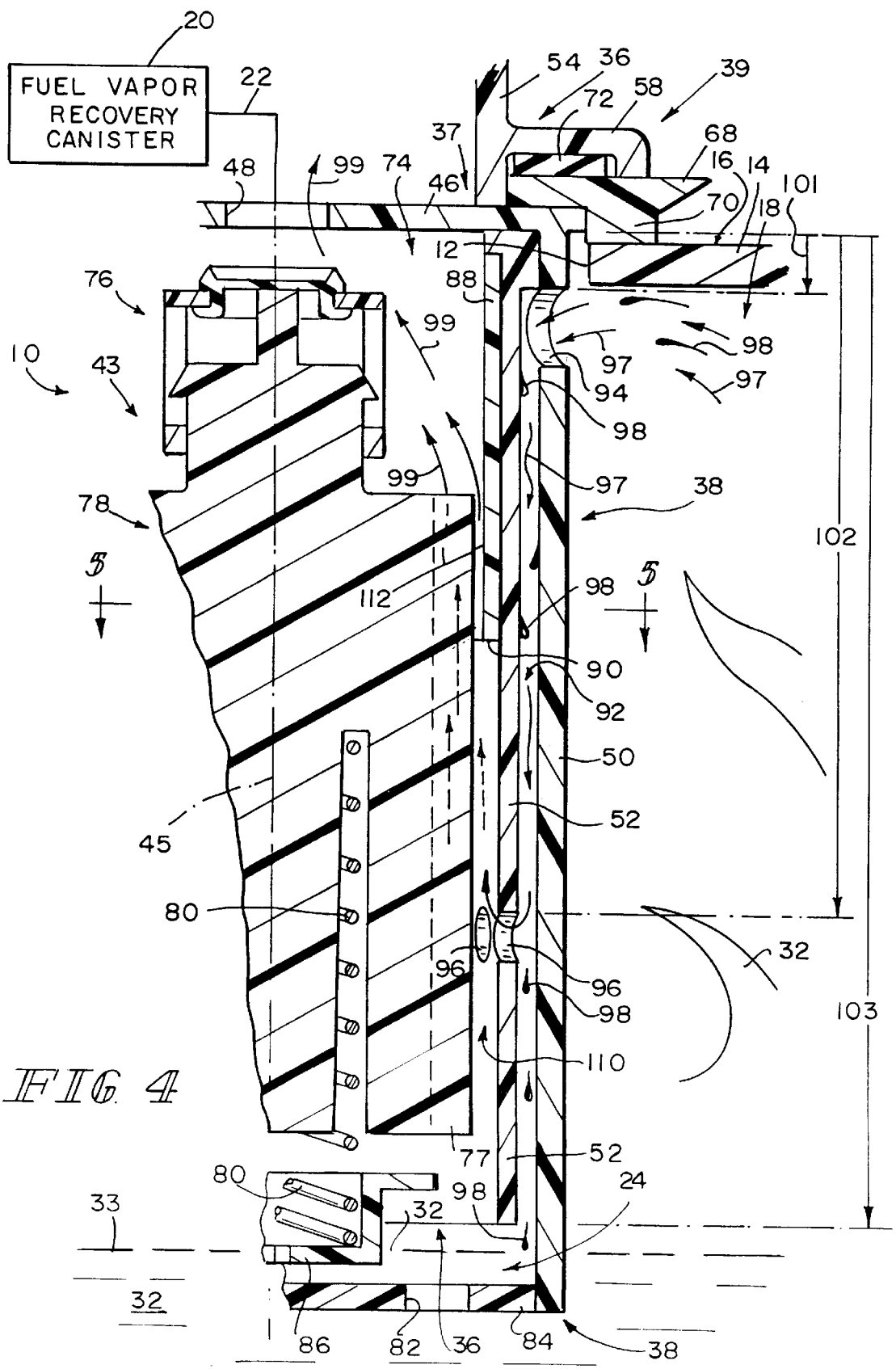

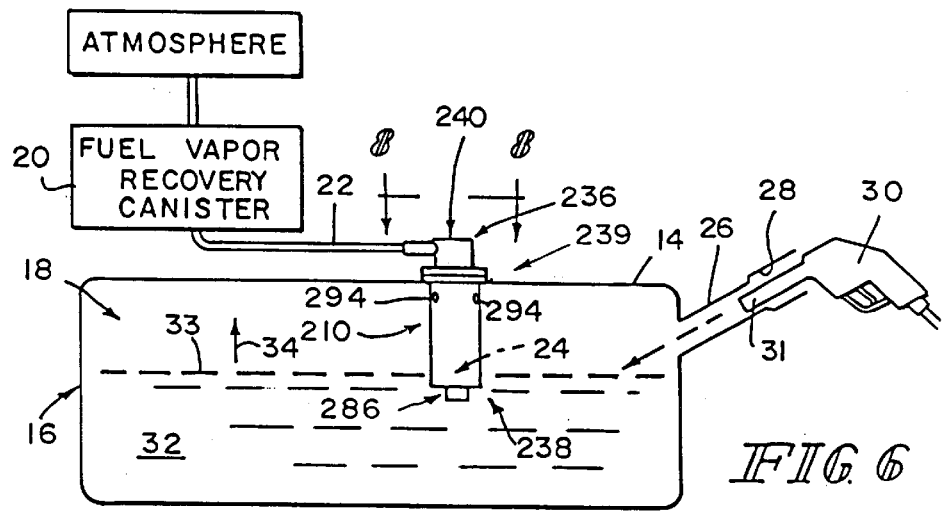
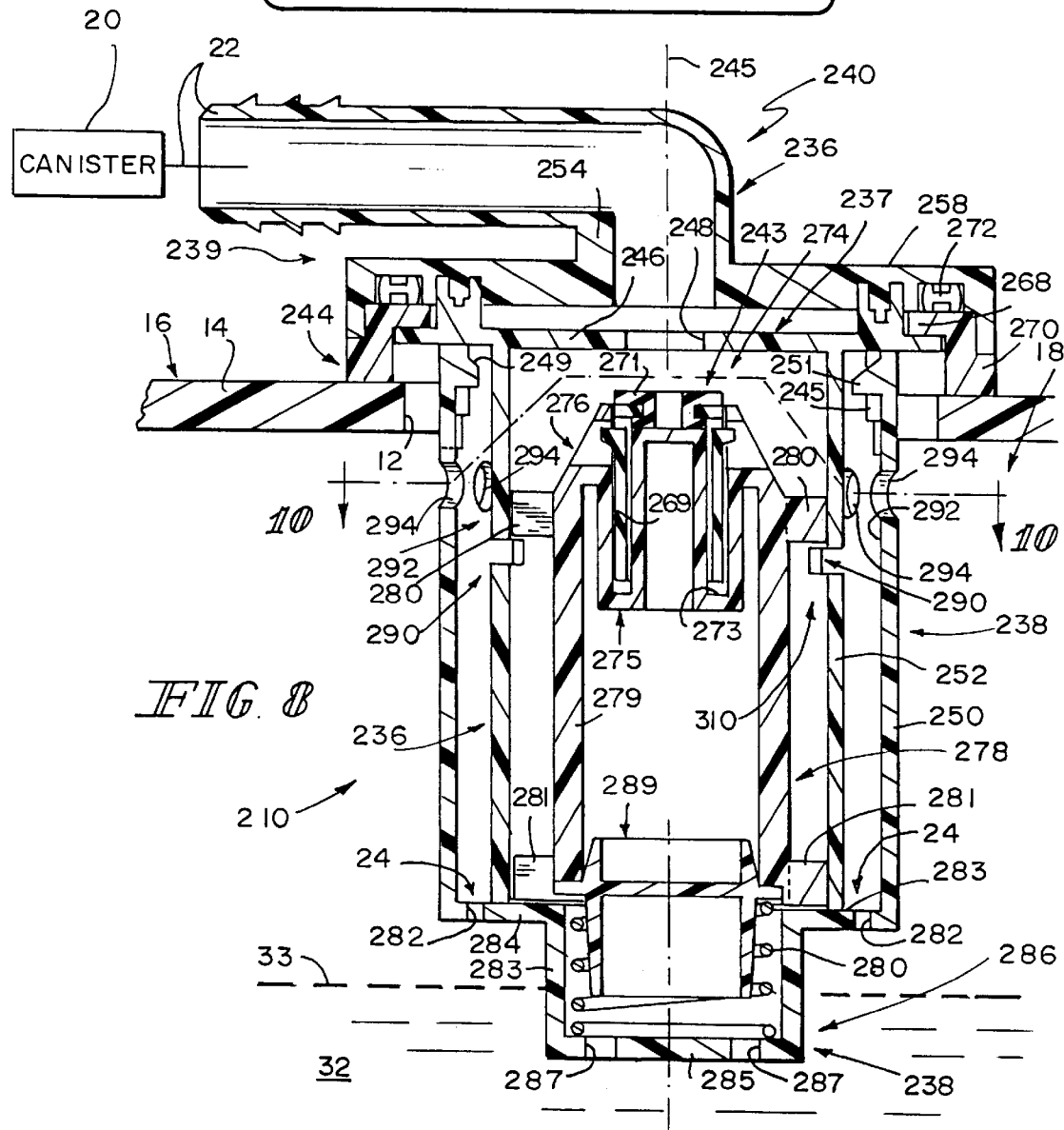

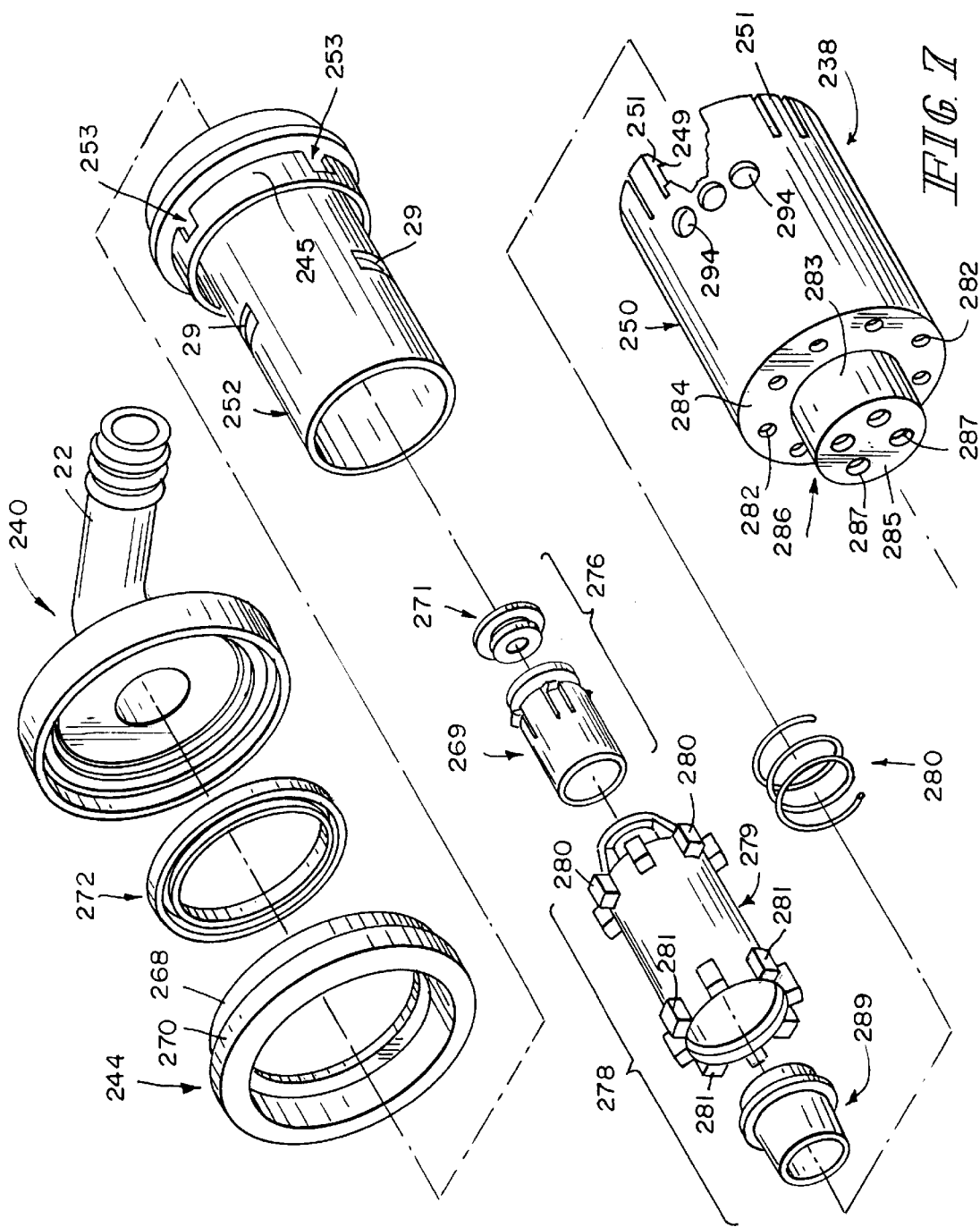
FIG. I

FUEL TANK VENT SYSTEM WITH LIQUID FUEL FILTER

This application claims priority under 35 U.S.C. 119(e) to U.S. Provisional Application Serial No. 60/274,334, filed Mar. 8, 2001, which is expressly incorporated by reference herein.

BACKGROUND AND SUMMARY

The present disclosure relates to fuel tank valve apparatus, and particularly to a liquid fuel filter for use with a fuel vapor vent system in a fuel tank. More particularly, the present disclosure relates to a system for venting fuel vapor from a tank to a vapor recovery canister without excessive carry-over of liquid fuel from the tank to the canister.

Vehicle fuel systems include tank-mounted valves for venting pressurized or displaced fuel vapor from the vapor space in a fuel tank to a vapor recovery canister located outside of the fuel tank. The canister is designed to capture and store fuel entrained in fuel vapors that are displaced and generated in the fuel tank during a typical vehicle refueling operation or that are otherwise vented from the fuel tank.

However, it is not desirable to discharge excessive amounts of liquid fuel into the vapor recovery canister. This is especially true during "maneuvering" of fuel tank vapor control apparatus mounted on a moving fuel tank of the type that occurs during "dynamic" testing of such vapor control apparatus. It is therefore desirable to minimize the amount of liquid fuel carryover from the fuel tank to the vapor recovery canister of the type that might occur during dynamic testing or other vehicle operation.

According to the present disclosure, a vent module is adapted to be mounted in a top wall of a fuel tank to vent fuel vapor from the tank to a vapor recovery canister located outside of the tank. An outer shell is positioned around the vent module to define a fuel vapor transfer passageway and a liquid fuel accumulation chamber.

Fuel vapor inlet and outlet ports are formed in the vent module to allow flow of fuel tank vapor through a valve chamber provided in the vent module to the canister. The fuel vapor inlet port receives fuel vapor exiting the fuel vapor transfer passageway. The vent module includes a valve movable in the valve chamber to block flow of fuel vapor from the tank to the canister through the fuel vapor outlet port.

The outer shell includes a fuel vapor transfer port arranged to "above" the fuel vapor inlet port formed in the vent module and to admit fuel vapor from the tank into the fuel vapor transfer passageway provided between the vent module and the outer shell. The liquid fuel accumulation chamber is located below and in fluid communication with the fuel vapor transfer passageway to receive liquid fuel shed from fuel vapor flowing in one direction through the fuel vapor transfer passageway as that fuel vapor is forced to flow in another direction from the fuel vapor transfer passageway through the fuel vapor inlet port into the chamber provided in the vent module.

In preferred embodiments, the outer shell is retained in a fixed position relative to the top wall of the fuel tank to position the fuel vapor transfer port at a somewhat high elevation near a ceiling established inside the fuel tank by the top wall. The outer shell is formed to include a drain port so that liquid fuel accumulated in the accumulation chamber will drain back into the liquid fuel reservoir in the tank once the fuel level recedes to a height in the fuel tank below the drain port.

During tank venting conditions, displaced or pressurized fuel vapor passes from the tank through the fuel vapor transfer port from the tank into the fuel vapor transfer passageway provided between the vent module and the outer shell. The fuel vapor flows in a downward direction in the fuel vapor transfer passageway from the higher elevation fuel vapor transfer port formed in the outer shell to the lower elevation fuel vapor inlet port formed in the vent module.

To enter the vent module through the laterally extending fuel vapor inlet port, the stream of fuel vapor that is flowing downwardly through the fuel vapor transfer passageway must change its flow direction. This "change of direction" causes the fuel vapor to shed droplets of liquid fuel entrained in the fuel vapor. Those droplets fall downwardly through a lower portion of the fuel vapor transfer passageway into the liquid fuel accumulation chamber while demoisturized, relatively dry fuel vapor flows into and through the vent module to reach the vapor recovery canister without "carryover" of any significant amount of liquid fuel from the tank to the canister. Any fuel entrained in this demoisturized, relatively dry fuel vapor will be captured and stored in the vapor recovery canister and later reused and burned in the vehicle engine in a well-known manner so as to minimize unwanted discharge of fuel vapor into the atmosphere.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 4 is an enlarged view of a portion of FIG. 3 showing fuel vapor and liquid fuel passing from the vapor space inside the tank into the fuel vapor transfer passageway through the fuel vapor transfer port formed in the outer shell and showing how (1) liquid fuel shed by fuel vapor traveling downwardly through the transfer passageway and (2) liquid fuel admitted into the transfer passageway through the transfer port falls downwardly into the underlying liquid fuel accumulation chamber and showing how "demoisturized" fuel vapor flows into the discharge conduit through the valve housing inlet port, chamber, and outlet port on its way to the fuel vapor recover canister coupled to the discharge conduit;

FIG. 6 is a diagrammatic view of a fuel tank during refueling and a fuel vapor recovery canister outside the tank and showing a vent unit in accordance with a second embodiment of the present disclosure mounted in the top wall of the fuel tank and coupled to the canister;

FIG. 7 is an exploded perspective assembly view of components used to form the tank-mounted vent apparatus shown in FIGS. 6 and 8;

FIG. 8 is a sectional view taken along lines 8—8 of FIG. 6 showing a vent apparatus mounted in an aperture formed in the top wall of the fuel tank, the vent apparatus comprising a valve module and an outer shell around the valve module, wherein the valve module includes a vent outlet mounted on the fuel tank and formed to include a discharge conduit coupled to the canister, a valve housing lying under the vent outlet and providing a chamber containing a vent valve member and a spring-biased buoyant float coupled to the vent valve member, and wherein the outer shell is positioned to lie around the valve housing and formed to include a fuel vapor transfer port near the top wall of the tank and above the fuel vapor inlet port, and showing a downwardly extending fuel vapor transfer passageway and a liquid fuel accumulation chamber provided between the outer shell and the valve housing to receive liquid fuel droplets falling downwardly through the transfer passageway;

DETAILED DESCRIPTION OF THE DRAWINGS

Figure 1:
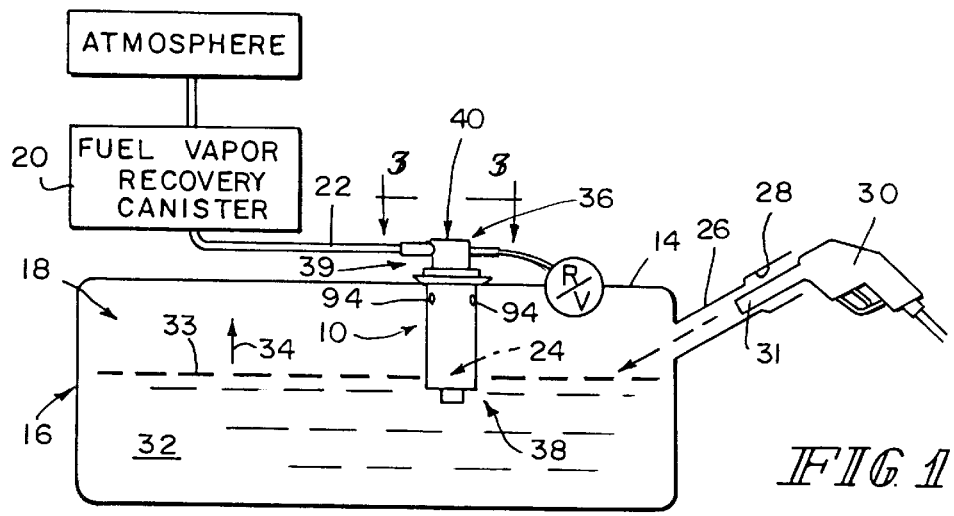
FIG. 1 is a diagrammatic view of a fuel tank during refueling and a fuel vapor recovery canister outside the tank and showing a vent apparatus in accordance with a first embodiment of the present disclosure mounted in the top wall of the fuel tank and coupled to the canister and to a rollover valve unit also mounted in the top wall of the fuel tank.
Figure 3:
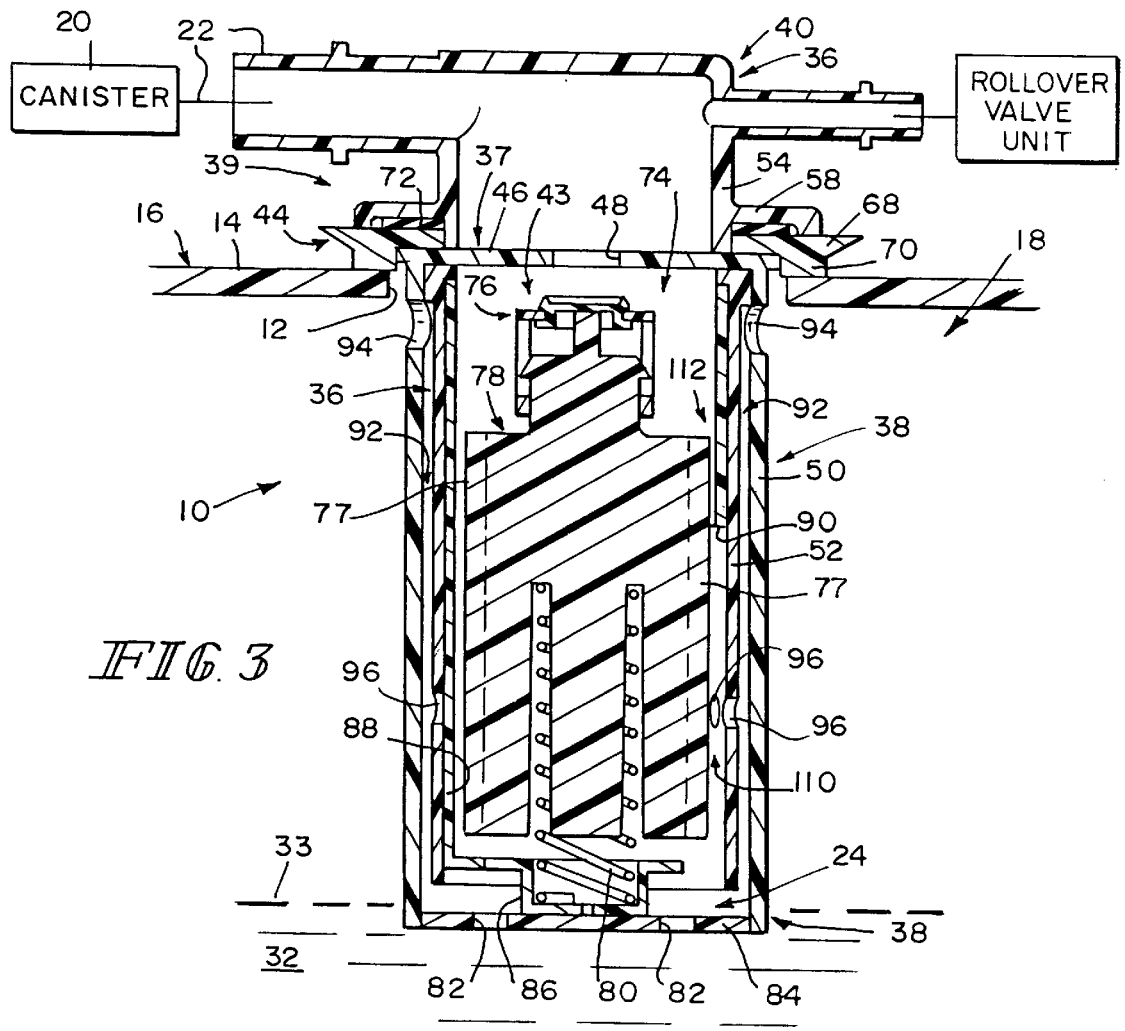
FIG. 3 is a sectional view taken along lines 3—3 of FIG. 1 showing a vent apparatus mounted in an aperture formed in the top wall of the fuel tank, the vent apparatus comprising a valve module and an outer shell around the valve module, wherein the valve module includes a vent outlet mounted on the fuel tank and formed to include a discharge conduit coupled to the canister, a valve housing lying under the vent outlet and providing a chamber containing a vent valve member and a spring-biased buoyant float coupled to the vent valve member, and wherein the outer shell is positioned to lie around the valve housing and formed to include a fuel vapor transfer port near the top wall of the tank and above the fuel vapor inlet port, and showing a downwardly extending fuel vapor transfer passageway provided between the outer shell and the valve housing and a liquid fuel accumulation chamber located in the outer shell under the valve housing.

A fuel tank vent apparatus 10 is mounted in an aperture 12 formed in a top wall 14 of a fuel tank 16 to regulate flow of pressurized fuel vapor from a vapor space 18 provided in tank 16 to a fuel vapor recovery canister 20 through a discharge conduit 22, as shown, for example, in FIGS. 1 and 3. Vent apparatus 10 is configured to cause fuel vapor traveling therethrough to shed liquid fuel entrained therein and to collect such liquid fuel (along with any other liquid fuel that is admitted into vent apparatus 10 due to fuel sloshing about inside tank 16) in a liquid fuel accumulation chamber 24 formed in a lower portion of vent apparatus 10. Thus, vent apparatus 10 acts as a liquid fuel carryover filter to prevent excessive amounts of liquid fuel from exiting tank 16 through discharge conduit 22 and then reaching the fuel vapor recovery canister 20 coupled to discharge conduit 22. A vent apparatus 210 in accordance with a second embodiment of the disclosure is shown, for example, in FIGS. 6 and 8 and assembled using components shown in FIG. 7.

A filler neck 26 is coupled to fuel tank 16 and formed to include an inlet 28 sized to receive a fuel-dispensing pump nozzle 30 as shown, for example, in FIG. 1. Nozzle 30 is used by a pump operator to introduce liquid fuel 32 into fuel tank 16 during vehicle refueling. As tank 16 is filled during refueling, the top surface 33 of liquid fuel 32 will rise in direction 34 as shown in FIG. 1. Once tank 16 is filled with fuel, a valve (comprising, e.g., vent valve member 76) will move to a closed position blocking further flow of fuel vapor from vent apparatus 10 to canister 20 through discharge conduit 22. At this stage of refueling, because pressurized fuel vapor extant in fuel tank 16 is unable to vent to canister 20 through discharge conduit 22, the pressure inside tank 16 will rise sharply to exceed the pressure of liquid fuel flowing into tank 16 through filler neck 26, causing liquid fuel flow in filler neck 26 to slow or "hesitate" and splash a fill-limit sensor 31 on pump nozzle 30 to shut off fuel flow from nozzle 30.

Vent apparatus 10 includes a vent module 36 adapted to be mounted in an aperture 12 formed in a top wall 14 of a fuel tank 16 and an outer shell 38 positioned to surround a lower portion of vent module 36 to define a fuel vapor transfer passageway 92 therebetween. Outer shell 38 is formed to include at least one fuel vapor transfer port 94 and vent module 36 is formed to include at least one fuel vapor inlet port 96. Fuel vapor transfer ports 94 are arranged to lie in axially spaced-apart relation to fuel vapor inlet ports 96 with respect to axis 45 of valve 43 as suggested in FIG. 4.

In use, as suggested in FIG. 4, fuel vapor 97 passes from vapor space 18 of tank 16 into fuel vapor transfer passageway 92 through fuel vapor transfer ports 94 formed in outer shell 38. This fuel vapor 97 flows downwardly in fuel vapor transfer passageway 92. Liquid fuel entrained in fuel vapor 97 is shed as fuel vapor passes laterally from fuel vapor transfer passageway 92 through fuel vapor inlet port 96 formed in vent module 36. This "change of direction" of fuel vapor flow produces liquid fuel droplets 98 that fall downwardly in fuel vapor transfer passageway 92 away from fuel vapor inlet port 96 to reach liquid fuel accumulation chamber 24 and produces a flow of demoisturized fuel vapor 99 that passes into vent module 36 through fuel vapor inlet port 96. This demoisturized, relatively dry fuel vapor flows into and through vent module 36 to reach fuel vapor recovery canister 20 without carryover of any significant amount of liquid fuel 32 from tank 16 to canister 20. Any liquid fuel entrained in this demoisturized, relatively dry fuel vapor will be captured and stored in fuel vapor recovery canister 20 and later reused and burned in a vehicle engine (not shown) so as to minimize unwanted discharge of fuel vapor into the atmosphere.

Vent module 36 includes a valve housing 37, a vent outlet 39 coupled to valve housing 37 and adapted to support valve housing 37 in an aperture 12 formed in top wall 14 of tank 16, and a valve 43 mounted for movement in a valve chamber 74 formed in valve housing 37 as shown, for example, in FIG. 3. Valve housing 37 includes a plate 46 formed to include a fuel vapor outlet port 48 and an inner sleeve 52 that cooperates with plate 46 to form chamber 74. Valve 43 is mounted for movement in chamber 74 between an opened position allowing flow of fuel vapor from chamber 74 into discharge conduit 22 through fuel vapor outlet port 48 and a closed portion blocking flow of fuel vapor from chamber 74 through fuel vapor outlet port 48. Inner sleeve 52 is formed to include at least one fuel vapor inlet port 96 as shown, for example, in FIGS. 3 and 4. These fuel vapor inlet ports 96 are arranged so that demoisturized fuel vapor can flow laterally through fuel vapor inlet ports 96 from fuel vapor transfer passageway 92 into chamber 74 for discharge to fuel vapor recovery module through fuel vapor outlet port 48 and discharge conduit 22 formed in vent outlet 39.

Vent outlet 39 includes a cap 40, a mount ring 44, and a seal ring 72 as shown, for example, in FIGS. 3 and 4. Cap 40 is coupled to valve housing 37 to trap mount ring 44 therebetween as shown, for example, in FIGS. 3 and 4 to facilitate mounting of vent module 36 in fuel tank aperture 12.

Outer shell 38 includes an outer sleeve 50 depending from plate 46 and arranged to surround inner sleeve 52 included in valve housing 37 as shown, for example, in FIGS. 3 and 4. In the illustrated embodiment, each of inner and outer sleeves 52, 50 is cylinder-shaped to cause fuel vapor transfer passageway 92 formed therebetween to be annular.

Cap 40 includes a cylindrical sleeve 54 and an annular mounting flange 58 coupled to a lower end of sleeve 54. Discharge conduit 22 is coupled to an upper end of sleeve 54 as shown, for example, in FIG. 3. Mount ring 44 includes an upper portion 68 arranged to extend into an annular space provided between annular mounting flange 58 and a peripheral portion of plate 46 and an annular lower portion 70 depending from upper portion 68 and adapted to seat on and be welded to top wall 14 of fuel tank 16. Seal ring 72 is trapped in a space provided between annular mounting flange 58 and annular upper portion 68 as shown, for example, in FIG. 3 to establish a sealed connection therebetween.

Mount ring 44 is made of a weldable plastics material such as high density polyethylene (HDPE) so that it can be welded to top wall 14 of tank 16 (also made of HDPE) to retain vent module 36 in a fixed position extending through tank aperture 12 as shown, for example, in FIG. 3. It is within the scope of this disclosure to retain vent module 36 in a fixed position in tank aperture 12 using any suitable means.

Valve housing 37 lies under cap 40 and inner sleeve 52 cooperates with plate 46 to provide a chamber 74 containing a vent valve member 76, a buoyant float 78, and a compression spring 80. Vent valve member 76 is movable from a normal, rest position (shown in FIG. 3) to a closed position (not shown) closing fuel vapor outlet port 48 so that pressurized fuel vapor is unable to pass from valve housing chamber 74 into discharge conduit 22. Vent valve member 76 is coupled to float 78 for relative movement therebetween using any suitable means.

Figure 2:
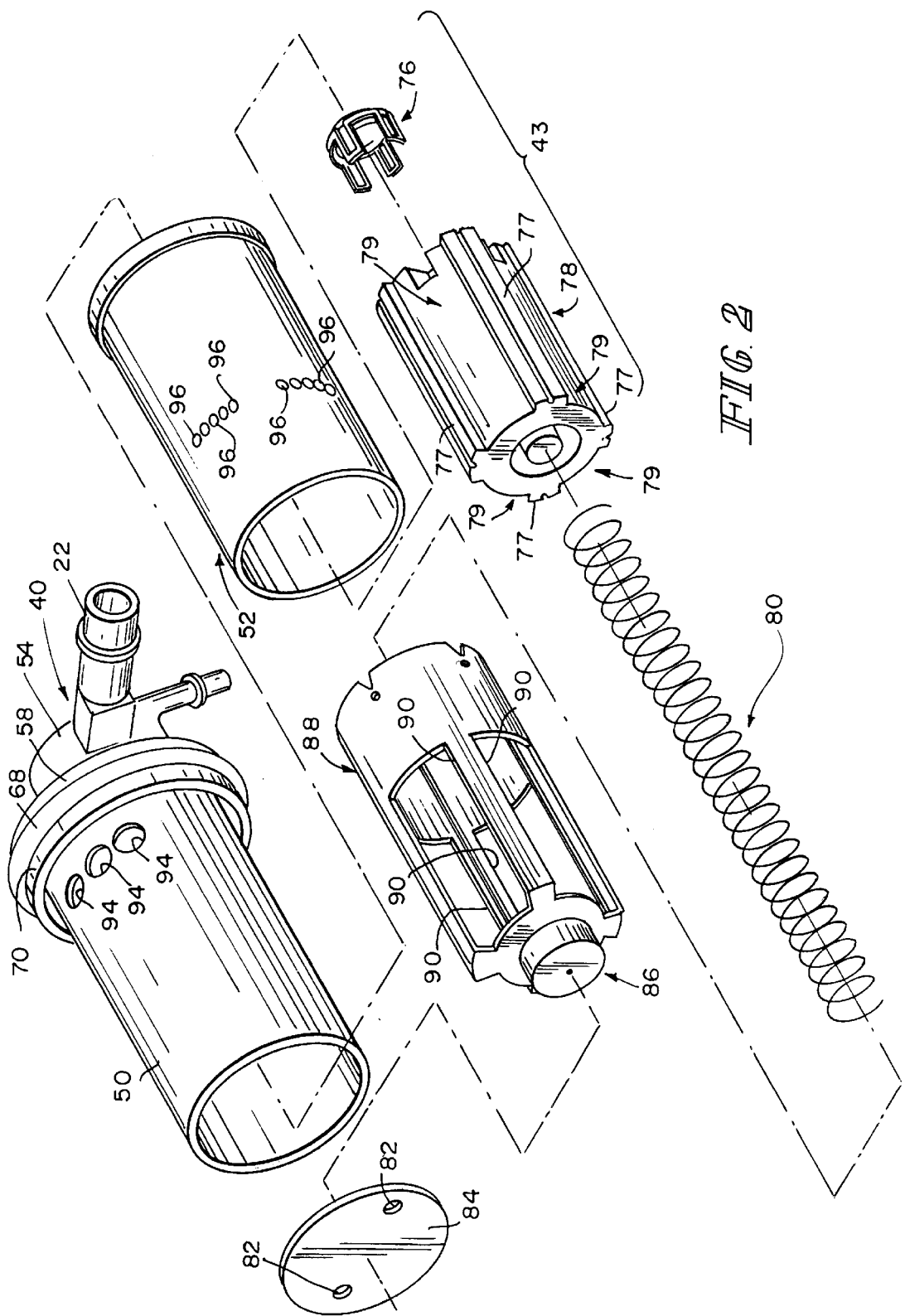
FIG. 2 is an exploded perspective assembly view of components used to form the tank-mounted vent apparatus shown in FIGS. 1 and 3.
Figure 5:
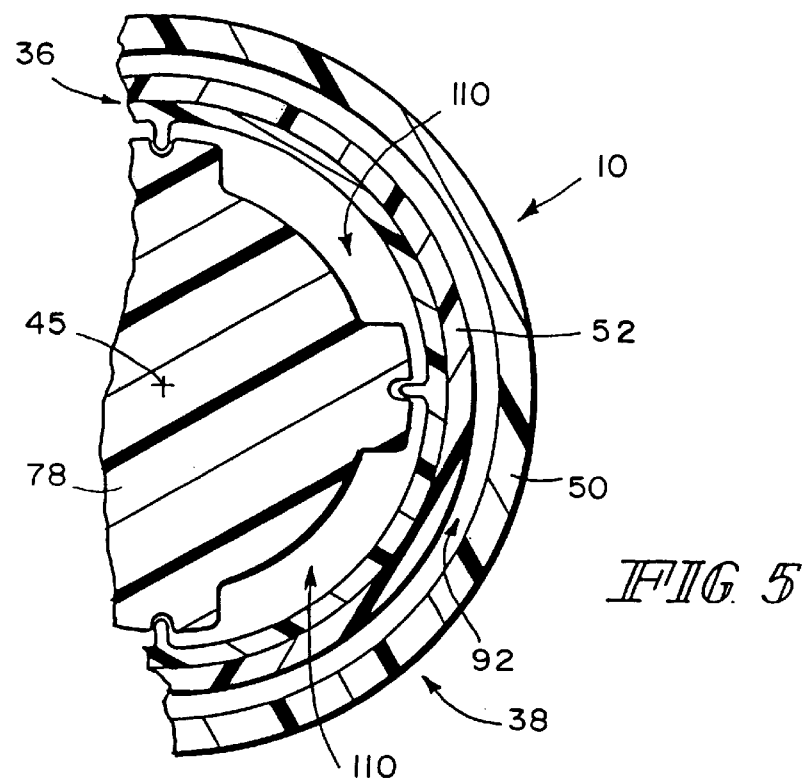
FIG. 5 is a sectional view taken along lines 5—5 of FIG. 4 showing the annular fuel vapor transfer passageway provided between an inner sleeve included in the valve housing and an outer sleeve included in the outer shell.

Buoyant float 78 is free to float on liquid fuel admitted into chamber 74 through openings 82 formed in a bottom plate 84 coupled to a lower end of outer sleeve 50. Vent valve member 76 is coupled to float 78 and is moved to its outlet port-closing position in response to sufficient upward movement of float 78 in chamber 74 during rising fuel levels in fuel tank 16 created by refueling or by fuel sloshing about inside fuel tank 16. Float 78 includes four circumferentially spaced-apart, axially extending guide ribs 77 and an axially extending fuel vapor flow channel 79 formed between each pair of adjacent guide ribs 77 as shown best in FIG. 2.

Compression spring 80 acts between float 78 and bottom plate 84 to assist in lifting float 78 within chamber 74 as the fuel level therein rises during refueling. Spring 80 extends upwardly into an annular channel formed in float 78 and downwardly into a receiver 86 provided under float 78 and carried by an internal sleeve 88 that includes four elongated circumferentially spaced-apart windows 90 and extends into valve housing 52 as shown, for example, in FIGS. 1 and 2. Receiver 86 is retained in a fixed position engaging an inner surface of bottom plate 84 as shown, for example in FIG. 3.

A downwardly extending, annular fuel vapor transfer passageway 92 is provided between cylinder-shaped inner sleeve 52 and cylinder-shaped outer sleeve 50. Several fuel vapor transfer ports 94 are formed in outer sleeve 50 and located near top wall 14 of tank 16 to admit fuel vapor from vapor space 18 of tank 16 into fuel vapor transfer passageway 92. Several laterally extending fuel vapor inlet ports 96 are formed in inner sleeve 52 to admit fuel vapor from transfer passageway 92 into chamber 74 provided in valve housing 37. In the illustrated embodiment, outer sleeve 50 includes two circumferentially spaced-apart sets of three closely spaced fuel vapor transfer ports 94 and inner sleeve 52 includes four circumferentially spaced-apart sets of five closely spaced fuel vapor inlet ports 96.

Liquid fuel is removed from fuel vapor as it passes from fuel tank 16 through vent apparatus 10 as shown, for example, in FIG. 4. Fuel vapor 97 laden with liquid fuel is admitted into the downwardly extending, annular fuel vapor transfer passageway 92 provided between inner sleeve 52 and outer sleeve 50 through transfer ports 94. Some liquid fuel droplets 98 can also find their way into transfer passageway 92 through transfer ports 94 when liquid fuel 32 is sloshing about inside tank 16.

Some of the "moist" fuel vapor 97 passing downwardly through annular transfer passageway 92 will flow into valve chamber 74 through laterally extending fuel vapor inlet ports 96 formed in a lower portion of valve housing 37. That fuel vapor 97 must change its direction of flow to pass from the "axially or downwardly extending" transfer passageway 92 into the "radially or laterally extending" inlet ports 96 as shown, for example, in FIG. 4.

As the flow of moist fuel vapor 97 changes direction to pass into inlet ports 96, that moist fuel vapor 97 sheds liquid fuel entrained in the fuel vapor 97 to produce liquid fuel droplets 98. These droplets 98 (along with any other liquid fuel droplets 98 present in transfer passageway 92) fall downwardly into the liquid fuel accumulation chamber 24 provided in vent apparatus 10 to receive such droplets 98 from fuel vapor transfer passageway 92.

As shown, for example, in FIG. 4, relatively dry, demoisturized fuel vapor 99 now flows through windows 90 and upwardly through passageways 110 formed between float 78 and valve housing 52 and passageways 112 formed between float 78 and internal sleeve 88 to reach an upper region of valve chamber 74. This dry fuel vapor 99 now exits chamber 74 through fuel vapor outlet port 48 and passes to fuel vapor recovery canister 20 via discharge conduit 22.

Figure 4A:
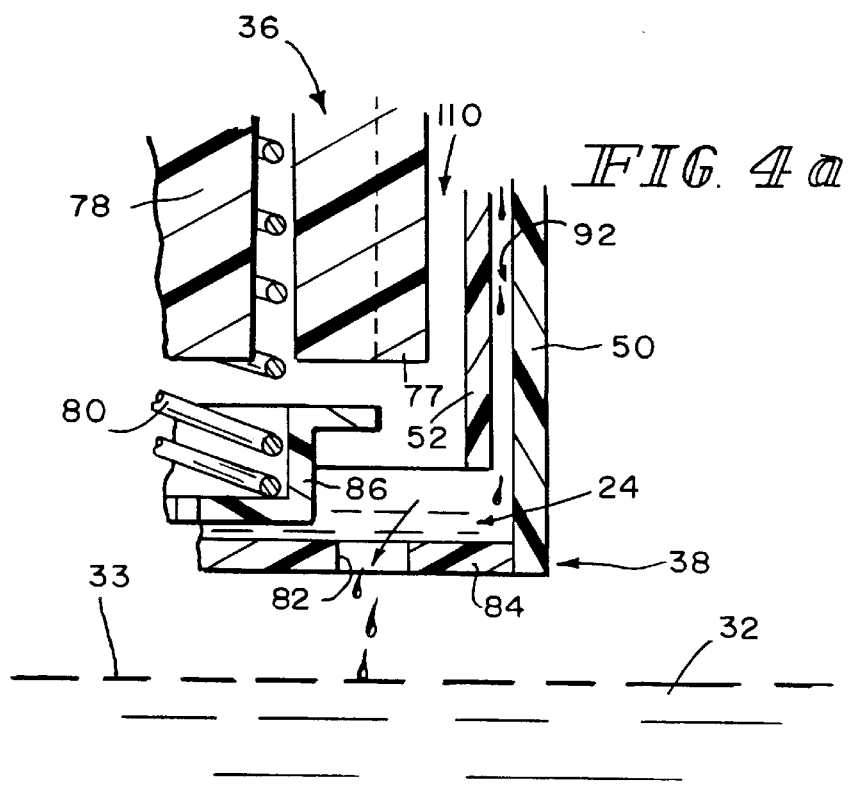
FIG. 4a is a view similar to a portion of FIG. 4 showing liquid fuel extant in the liquid fuel accumulation chamber draining into a reservoir of liquid fuel extant in the tank through a drain port formed in the outer shell after the fuel level has receded to a height in the fuel tank below the drain port.

Referring now to FIG. 4a, any liquid fuel that has accumulated in accumulation chamber 24 because the level of liquid fuel 32 in tank 16 was high enough to fill and therefore effectively "close" openings 82 in bottom plate 84 will later drain through openings (i.e., drain ports) 82 when the level of liquid fuel 32 recedes to a height in tank 16 below drain ports 82. Such drainage is illustrated in FIG. 4a.

As shown in FIGS. 3 and 4, a lower portion of outer sleeve 50 and bottom plate 84 cooperate to define reservoir means for providing a liquid fuel accumulation chamber 24 to receive liquid fuel droplets 98 present in fuel vapor transfer passageway 92. Bottom plate 84 is coupled to the lower portion of outer sleeve 50 and positioned to lie below a lower r end of inner sleeve 52. Bottom plate (floor) 84 is formed to include at least one drain port 82 to drain liquid fuel 32 from liquid fuel accumulation chamber 24 to a destination (e.g., interior region in fuel tank 16) below valve housing 37.

As shown, for example, in FIG. 4, outer sleeve 50 is coupled to vent module 36 to position each fuel vapor transfer port 94 to lie at a first distance 101 from and below plate 46. Inner sleeve 52 is arranged to position each fuel vapor inlet port 96 to lie a greater second distance 102 from and below plate 46. Outer shell 38 and vent module 36 cooperate to position liquid fuel accumulation chamber 24 to lie a still greater third distance 103 from and below plate 46. It is within the scope of this disclosure to rearrange the relative locations of ports 94, 96 and chamber 24 so long as ports 96 lie between ports 94 and chamber 24. Although plate 46 is oriented to lie in a horizontal position in vent module 36, it is within the scope of this disclosure to vary the orientation to provide a suitable configuration of vent module 36.

Vent apparatus 210 is configured to operate in a manner similar to vent apparatus 10 and is illustrated, for example, in FIGS. 6–11. Like vent apparatus 10, vent apparatus 210 operates to limit carryover of liquid fuel from fuel tank 16 to vapor recovery canister 20 so that excessive amounts of liquid fuel are not discharged into canister 20. Components used to form vent apparatus 210 are shown, for example, in FIG. 7.

Vent apparatus 210 includes a vent module 236 adapted to be mounted in an aperture 12 formed in a top wall 14 of a fuel tank 16 and an outer shell 238 positioned to surround a lower portion of vent module 236 to define a fuel vapor transfer passageway 292 therebetween. Outer shell 239 is formed to include at least one fuel vapor transfer port 294 and vent module 236 is formed to include at least one fuel vapor inlet port 290. Fuel vapor transfer ports 294 are arranged to lie in axially spaced-apart relation to fuel vapor inlet ports 290 with respect to axis 245 of valve 243 as suggested in FIG. 8.

Figure 9:
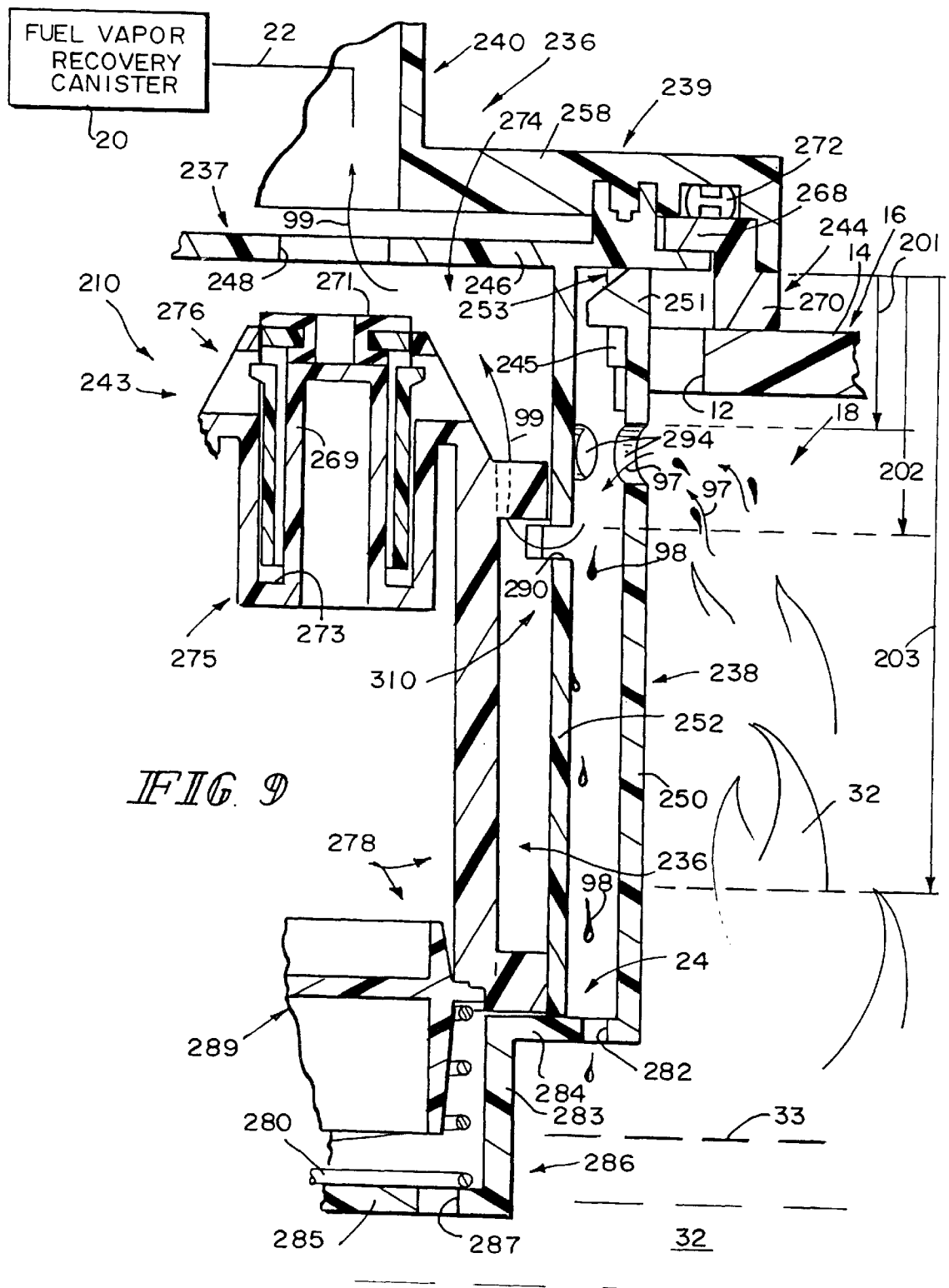
FIG. 9 is an enlarged view of a portion of FIG. 8 showing fuel vapor and liquid fuel passing from the vapor space inside the tank into the fuel vapor transfer passageway through the fuel vapor transfer port formed in the outer shell and showing how (1) liquid fuel shed by fuel vapor traveling downwardly through the transfer passageway and (2) liquid fuel admitted into the transfer passageway through the transfer port falls downwardly into the underlying liquid fuel accumulation chamber and showing how "demoisturized" fuel vapor flows into the discharge conduit through the valve housing inlet port, chamber, and outlet port on its way to the fuel vapor recover canister coupled to the discharge conduit.
Figure 10:
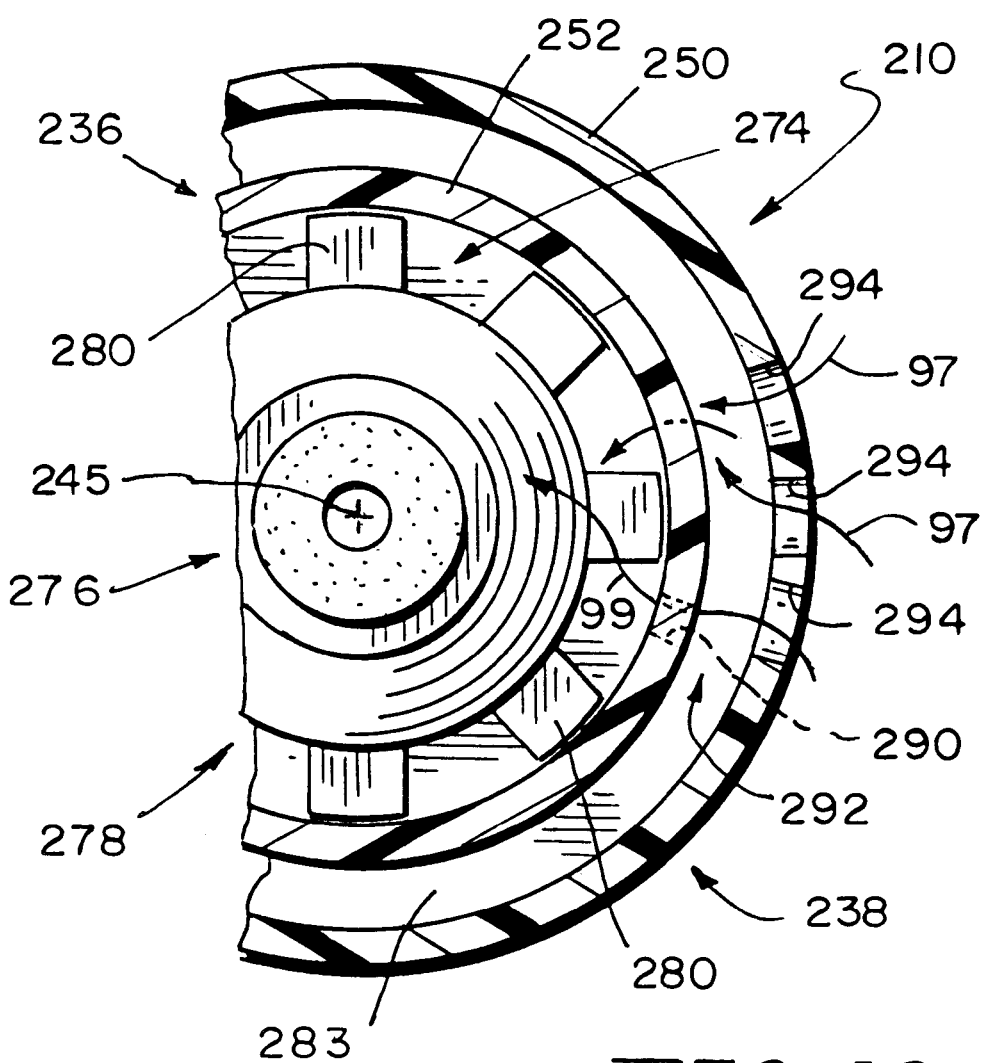
FIG. 10 is a sectional view taken along line 10—10 of FIG. 8 showing fuel vapor passing through three fuel vapor transfer ports provided in the outer shell into the annular fuel vapor transfer passageway provided between an inner sleeve included in the valve housing and an outer sleeve included in the outer shell.
Figure 11:
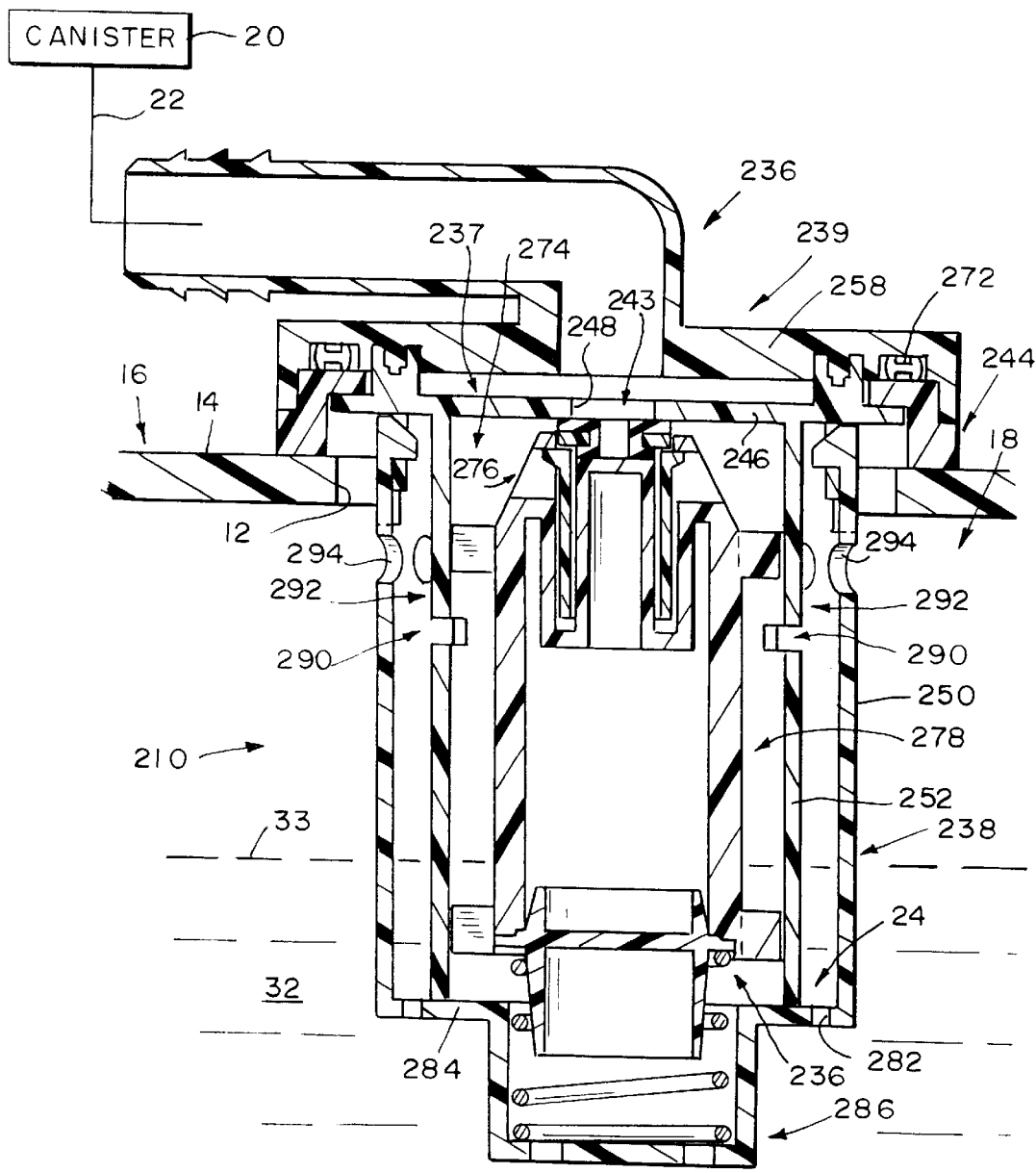
FIG. 11 is a sectional view similar to FIG. 8 showing movement of the vent valve member in the valve housing chamber to close the fuel vapor outlet port formed in the valve housing in response to upward movement of the buoyant float on liquid fuel admitted into the valve housing chamber during tank refueling so that further venting of fuel vapor from the tank to the canister through the discharge conduit is blocked.

In use, as suggested in FIG. 9, fuel vapor 97 passes from vapor space 18 of tank 16 into fuel vapor transfer passageway 292 through fuel vapor transfer ports 294 formed in outer shell 38. This fuel vapor 97 flows downwardly in fuel vapor transfer passageway 292. Liquid fuel entrained in fuel vapor 97 is shed as fuel vapor passes laterally from fuel vapor transfer passageway 292 through fuel vapor or inlet port 290 formed in vent module 236. This "change of direction" of fuel vapor flow produces liquid fuel droplets 98 that fall downwardly in fuel vapor transfer passageway 292 away from fuel vapor inlet port 290 to reach liquid fuel accumulation chamber 24 and produces a flow of demoisturized fuel vapor 99 that passes into vent module 236 through fuel vapor inlet port 290. This demoisturized, relatively dry fuel vapor flows into and through vent module 236 to reach fuel vapor recovery canister 20 without carryover of any significant amount of liquid fuel 32 from tank 16 to canister 20. Any liquid fuel entrained in this demoisturized, relatively dry fuel vapor will be captured and stored in fuel vapor recovery canister 20 and later reused and burned in a vehicle engine (not shown) so as to minimize unwanted discharge of fuel vapor into the atmosphere.

Vent module 236 includes a valve housing 237, a vent outlet 239 coupled to valve housing 237 and adapted to support valve housing 237 in an aperture 12 formed in top wall 14 of tank 16, and a valve 243 mounted for movement in a valve chamber 274 formed in valve housing 237 as shown, for example, in FIG. 8. Valve housing 237 includes a plate 246 formed to include a fuel vapor outlet port 248 and an inner sleeve 252 that cooperates with plate 246 to form chamber 274. Valve 243 is mounted for movement in chamber 274 between an opened position (shown in FIGS. 8 and 9) allowing flow of fuel vapor from chamber 274 into discharge conduit 22 through fuel vapor outlet port 248 and a closed position (shown in FIG. 11) blocking flow of fuel vapor from chamber 274. Inner sleeve 252 is formed to include at least one fuel vapor inlet port 290 as shown, for example, in FIGS. 8 and 9. These fuel vapor inlet ports 290 are arranged so that demoisturized fuel vapor can flow laterally through fuel vapor inlet ports 290 from fuel vapor transfer passageway 292 into chamber 274 for discharge to fuel vapor recovery module 20 through fuel vapor outlet port 248 and discharge conduit 22 formed in vent outlet 239.

Vent outlet 239 includes a cap 240, a mount ring 244, and a seal ring 272 as shown, for example, in FIGS. 8 and 9. Cap 240 is coupled to valve housing 237 to trap mount ring 244 therebetween as shown, for example, in FIGS. 8 and 9 to facilitate mounting of vent module 236 in fuel tank aperture 12.

Outer shell 238 includes an outer sleeve 250 depending from plate 246 and arranged to surround inner sleeve 252 included in valve housing 237 as shown, for example, in FIGS. 8 and 9. In the illustrated embodiment, each of inner and outer sleeves 252, 250 is cylinder-shaped to cause fuel vapor transfer passageway 292 formed therebetween to be annular.

Cap 240 includes a cylindrical sleeve 254 and an annular mounting flange 258 coupled to a lower end of sleeve 254. Discharge conduit 22 is coupled to an upper end of sleeve 254 as shown, for example, in FIG. 8. Mount ring 244 includes an upper portion 268 arranged to extend into an annular space provided between annular mounting flange 258 and a peripheral portion of plate 246. Mount ring 244 also include a lower portion 270 depending from upper portion 268 and adapted to seat on and be welded to top wall 14 of fuel tank 16. Seal ring 272 is trapped in a space provided between annular mounting flange 258 and annular upper portion 268 as shown, for example, in FIG. 8 to establish a sealed connection therebetween.

Mount ring 244 is made of a weldable plastics material such as high density polyethylene (HDPE) so that it can be welded to top wall 14 of fuel tank 16 (also made of HDPE) to retain vent module 236 in a fixed position extending through tank aperture 12 as shown, for example, in FIG. 8.

It is within the scope of this disclosure to retain vent module 236 in a fixed position in tank aperture 12 or relative to tank 16 using any suitable means.

As shown best in FIGS. 7 and 8, outer shell 238 includes an upper cylindrical portion defined by outer sleeve 250 and a receiver 286 depending from an inner edge of annular bottom plate 284. Annular bottom plate 284 is coupled to a lower edge of outer sleeve 250 and formed to include several drain ports 282. Receiver 286 includes a cylindrical side wall 283 and a plate 285 coupled to a lower edge of cylindrical side wall 283 and formed to include several openings 287 as shown, for example, in FIGS. 7 and 8.

Connectors 251 are provided on an axially upper end of outer sleeve 250 and configured to be coupled to a support 245 depending from plate 246 as shown, for example, in FIGS. 8 and 9 to support vent module 236 in a fixed position in tank aperture 12 under cap 240 when cap 240 is fixed to top wall 14 of fuel tank 16 by mount ring 244. When assembled, each connector 251 will snap into or otherwise be retained in a notch 253 formed in support 245 as shown, for example, in FIGS. 7–9. Each connector 251 includes an axially upwardly facing inclined ramp 249 to facilitate snap-engagement of connectors 251 into notches 253 during assembly of those components to produce vent apparatus 210.

Valve housing 237 lies under cap 240 and cooperates with plate 246 to provide a valve chamber 274 containing a vent valve member 276, a buoyant float 278, and a compression spring 280. Vent valve member 276 is movable from a normal, rest position (shown in FIG. 8) to a closed position (shown in FIG. 11) closing fuel vapor outlet port 248 so that pressurized fuel vapor is unable to pass from valve chamber 274 into discharge conduit 22. Vent valve member 276 is coupled to float 278 for relative movement therebetween using any suitable means.

Buoyant float 278 is free to float on liquid fuel admitted into chamber 274 through openings 287 formed in a plate 285 included in receiver 286. Vent valve member 276 is coupled to float 278 and is moved to its outlet port-closing position in response to sufficient upward movement of float 278 in chamber 274 during rising fuel levels in fuel tank 16 created by refueling or fuel sloshing about inside fuel tank 16.

Float 278 includes an elongated cylindrical body 279, a first set of circumferentially spaced-apart, radially outwardly extending, exterior guide lugs 280 appended to an axially upper end of cylindrical body 279, and a second set of circumferentially spaced-apart, radially outwardly extending exterior guide lugs 281 appended to an axially lower end of cylindrical body 279 as shown best in FIG. 7. Float 278 also includes an internal sleeve 275 formed to provide an annular channel 273 sized to receive a lower portion of vent valve member 276 to allow vent valve member 276 to undergo limited movement relative to float 278 as shown best in FIG. 8. Float 278 also includes a float support 289 coupled to a lower end of cylindrical body 279.

Vent valve member 276 includes a closure seal 271 mounted on a seal support 269 as shown in FIGS. 7 and 8. A lower portion of seal support 269 is sized to fit into and move in annular channel 273 formed in float 278.

Compression spring 280 acts between float 278 and plate 285 to assist in lifting float 278 within valve chamber 274 as the fuel level therein rises during refueling. Spring 280 extends upwardly to engage float support 289 coupled to float 278 and downwardly into a chamber formed in the receiver 286 provided under float 278.

A downwardly extending, annular fuel vapor transfer passageway 292 is provided between cylinder-shaped inner sleeve 252 and cylinder-shaped outer sleeve 250. Several fuel vapor transfer ports 294 are formed in outer sleeve 250 and located near top wall 14 of tank 16 to admit fuel vapor from vapor space 18 of tank 16 into transfer passageway 292. Several laterally extending fuel vapor inlet ports 290 are formed in inner sleeve 252 to admit fuel vapor from transfer passageway 292 into valve chamber 274 provided in valve housing 237. In the illustrated embodiment, outer sleeve 250 includes two circumferentially spaced-apart sets of three closely spaced fuel vapor transfer ports 294 and inner sleeve 252 includes two circumferentially spaced-apart, somewhat rectangle-shaped fuel vapor inlet ports 290.

Liquid fuel is removed from fuel vapor as it passes from fuel tank 16 through vent apparatus 10 as shown, for example, in FIG. 9. Fuel vapor 97 laden with liquid fuel is admitted into the downwardly extending annular fuel vapor vent passageway 292 provided between inner sleeve 252 and outer sleeve 250 through transfer ports 294. Some liquid fuel droplets 98 can also find their way into transfer passageway 292 through transfer ports 294 when liquid fuel 32 is sloshing about inside tank 16.

Some of the "moist" fuel vapor 97 passing downwardly through annular transfer passageway 292 will flow into valve chamber 274 through laterally extending fuel vapor inlet ports 290 formed in inner sleeve 252. That fuel vapor 97 must change its direction of flow to pass from the "axially or downwardly extending" transfer passageway 292 into the "radially or laterally extending" inlet ports 290.

As the flow of moist fuel vapor 97 changes direction to pass into inlet ports 290, that moist fuel vapor 97 sheds liquid fuel entrained in the fuel vapor 97 to produce liquid fuel droplets 98. These droplets 98 (along with any other liquid fuel droplets 98 present in transfer passageway 92) fall downwardly into the liquid fuel accumulation chamber 24 provided in vent apparatus 10 to receive such droplets 98 from fuel vapor transfer passageway 292.

As shown, for example, in FIG. 9, relatively dry, demoisturized fuel vapor 99 now flows upwardly through passageways 310 formed between float 278 and inner sleeve 252 to reach an upper region of valve chamber 274. This dry fuel vapor 99 now exits chamber 274 through fuel vapor outlet port 248 and passes to fuel vapor recovery canister 20 via discharge conduit 22.

The concentric arrangement of annular outer sleeve 250 and annular inner sleeve 252 provides an annular axially downwardly extending transfer passageway 292 to force the flow of liquid fuel to separate from the flow of fuel vapor before fuel vapor is vented from the tank 16 to the canister 20. A torturous path is provided to cause fuel vapor to shed liquid into an accumulation chamber 24 as that vapor is vented from the tank 16. The torturous path takes advantage of the weight of liquid fuel versus the weight of vapor. The flow in transfer passageway 92 is downward. The flow must turn 180° (upward) to exit vent apparatus 210. The heavier liquid fuel will not be able to make the abrupt direction change and will fall into the accumulation chamber 24.

The liquid accumulation chamber 24 is provided at the bottom of valve apparatus 210 to capture liquid attempting to exit valve apparatus 210. The accumulation chamber 24 can be sized larger or smaller to accommodate specific vehicle platform needs. "Trapped" liquid fuel in the accumulation chamber 24 is allowed to drain back into the fuel tank 16.

As shown in FIGS. 8 and 9, a lower portion of inner and outer annular sleeves 252, 250 and an annular portion 283 of bottom plate 284 extending therebetween cooperate to define reservoir means for providing a liquid fuel accumulation chamber 24 to receive liquid fuel droplets 98 present in fuel vapor transfer passageway 292. Annular portion 283 provides an annular floor defining a lower boundary of accumulation chamber 24 and is formed to include at least one drain port 282.

As shown, for example, in FIG. 8, outer sleeve 250 is coupled to vent module 236 to position each fuel vapor transfer port 294 to lie at a first distance 201 from and below plates 246. Inner sleeve 252 is arranged to position each fuel vapor inlet port 290 to lie a greater second distance 202 from and below plate 246. Outer shell 238 and vent module 236 cooperate to position liquid fuel accumulation chamber 24 to lie a still greater third distance 203 from and below plate 246. It is within the scope of this disclosure to rearrange the relative locations of ports 294, 298 and chamber 24 so long as ports 290 lie between ports 294 and chamber 24. Although plate 2246 is oriented to lie in a horizontal position in vent module 236, it is within the scope of this disclosure to vary this orientation to provide a suitable configuration of vent module 236.

What is claimed is:

1. A fuel tank vent apparatus comprising a valve housing including an inner sleeve formed to include a chamber and a plate formed to include a fuel vapor outlet port arranged to discharge fuel vapor extant in the chamber, the inner sleeve being formed to include a fuel vapor inlet port, a vent outlet coupled to the valve housing and adapted to support the valve housing in an aperture formed in a wall of a fuel tank, the vent outlet being formed to include a fuel vapor vent passageway arranged to conduct fuel vapor discharged from the chamber in the valve housing through the fuel vapor outlet port to a destination outside the valve housing, a valve mounted for movement in the chamber between an opened position allowing flow of fuel vapor from the chamber into the fuel vapor vent passageway through the fuel vapor outlet port and a closed position blocking flow of fuel vapor from the chamber into the fuel vapor vent passageway through the fuel vapor outlet port, an outer sleeve formed to include a fuel vapor transfer port, and means for demoisturizing fuel vapor admitted into the chamber through the vapor inlet port formed in the inner sleeve by supporting the outer sleeve in a position surrounding the inner sleeve to provide a fuel vapor transfer passageway extending downwardly in a downward direction away from the plate from the fuel vapor transfer port formed in the outer sleeve and positioned to lie a first distance below the plate to the fuel vapor inlet port formed in the inner sleeve and positioned to lie a greater second distance below the plate so that liquid fuel entrained in fuel vapor passing into the fuel vapor transfer passageway through the fuel vapor transfer port formed in the outer sleeve and flowing in the downward direction through the fuel vapor transfer passageway is shed as fuel vapor passes laterally from the fuel vapor transfer passageway through the vapor inlet port into the chamber to produce liquid fuel droplets falling in the downward direction in the fuel vapor transfer passageway away from the fuel vapor inlet port and to produce a flow of demoisturized fuel vapor passing into the chamber from the fuel vapor transfer passageway for discharge into the fuel vapor vent passageway formed in the vent outlet through the fuel vapor outlet port when the valve is moved to assume the opened position.

2. The apparatus of claim 1, further comprising reservoir means for providing a liquid fuel accumulation chamber to receive liquid fuel droplets present in the fuel vapor transfer passageway.

3. The apparatus of claim 2, wherein lower portions of the inner and outer sleeves and a bottom plate extending therebetween cooperate to define the reservoir means.

4. The apparatus of claim 3, wherein the bottom plate is formed to include at least one drain port to drain liquid fuel from the liquid fuel accumulation chamber to a destination below the valve housing.

5. The apparatus of claim 3, wherein each of the lower portions is cylinder-shaped and the bottom plate is coupled to each of the lower portions to define an annular floor extending between the lower portions of the inner and outer sleeves.

6. The apparatus of claim 2, wherein a lower portion of the outer sleeve and a bottom plate coupled to the lower portion of the outer sleeve and positioned to lie below a lower end of the inner sleeve cooperate to define the reservoir means.

7. The apparatus of claim 6, wherein the bottom plate is formed to include at least one drain port to drain liquid fuel from the liquid fuel accumulation chamber to a destination below the valve housing.

8. The apparatus of claim 1, wherein each of the inner and outer sleeves is cylinder-shaped to cause the fuel vapor transfer passageway formed therebetween to be annular.

9. The apparatus of claim 1, wherein the valve housing further includes a bottom wall coupled to a lower portion of the inner sleeve to provide a floor for the chamber, the valve includes a buoyant float free to float on liquid fuel admitted into the chamber through a fluid admission opening formed in the bottom wall and a vent valve member mounted on the buoyant float and arranged to close the fuel vapor outlet port upon movement of the valve to assume the closed position, the buoyant float includes an elongated body arranged to support the vent valve member, a first set of circumferentially spaced-apart, radially outwardly extending, exterior guide lugs appended to an axially upper end of the elongated body and arranged to contact an interior wall of the interior sleeve, and a second set of circumferentially spaced-apart, radially outwardly extending, exterior guide lugs appended to an axially lower end of the body and arranged to contact the interior wall of the interior sleeve.

10. The apparatus of claim 9, wherein the bottom wall includes a radially outwardly extending bottom plate positioned to lie below the fuel vapor inlet port formed in the inner sleeve and coupled to lower portions of the inner and outer sleeves to cooperate therewith to form a liquid fuel accumulation chamber located to receive liquid fuel droplets present in the fuel vapor transfer passageway.

11. The apparatus of claim 9, wherein the bottom wall further includes a receiver including a side wall depending from an inner edge of the radially outwardly extending bottom plate and a floor plate coupled to a lower edge of the side wall and formed to include the fluid admission opening, the side wall and the floor plate cooperate to define a space therein in fluid communication with the chamber in the inner sleeve, and the valve further includes spring means located in the space formed in the receiver for assisting in lifting the buoyant float in a direction toward the vent outlet as liquid fuel is admitted into the space and rises into the chamber to reach and raise the buoyant float in the chamber so that the valve is moved toward the closed position.

12. The apparatus of claim 10, wherein the radially outwardly extending bottom plate is formed to include at least one drain port to drain liquid fuel from the liquid fuel accumulation chamber to a destination below the valve housing.

13. A fuel tank vent apparatus comprising a vent module adapted to be mounted in an aperture formed in a top wall of a fuel tank, the vent module being formed to include a valve chamber, a fuel vapor inlet port arranged to admit fuel vapor into the valve chamber, and a fuel vapor outlet port arranged to discharge fuel vapor from the valve chamber to a destination outside the vent module, the vent module further including a valve mounted for movement in the chamber between an opened position allowing flow of fuel vapor from the chamber through the fuel vapor outlet port and a closed position blocking flow of fuel vapor from the chamber through the fuel vapor outlet port, and an outer shell formed to include a fuel vapor transfer port arranged to admit fuel vapor from a region outside the outer shell, the outer shell being positioned to lie in spaced-apart relation to the vent module to define a fuel vapor transfer passageway therebetween to conduct fuel vapor from the fuel vapor transfer port to the fuel vapor inlet port.

14. The apparatus of claim 13, wherein the outer shell includes an outer sleeve formed to include the fuel vapor transfer port and an interior region, the vent module includes an inner sleeve positioned to lie in the interior region of the outer sleeve and formed to include the fuel vapor inlet port, and the inner and outer sleeves cooperate to define the fuel vapor transfer passageway therebetween.

15. The apparatus of claim 14, wherein the vent module further includes a plate coupled to an upper portion of the inner sleeve and formed to include the fuel vapor outlet port, the outer sleeve is coupled to the vent module to position the fuel vapor transfer port to lie a first distance below the plate, the inner sleeve is arranged to position the fuel vapor inlet port to lie a greater second distance below the plate.

16. The apparatus of claim 15, wherein the outer shell and the vent module cooperate to define a liquid fuel accumulation chamber positioned to lie a still greater third distance below the plate and in fluid communication with the fuel vapor transfer passageway formed between the inner and outer sleeves.

17. The apparatus of claim 14, wherein the outer shell and the vent module cooperate to define a liquid fuel accumulation chamber in fluid communication with the fuel vapor transfer port and arranged to collect any liquid fuel droplets shed by fuel vapor passing from the fuel vapor transfer passageway into the chamber through the fuel vapor inlet port formed in the outer sleeve.

18. The apparatus of claim 17, wherein the outer shell further includes a floor coupled to the inner and outer sleeves to provide a lower boundary of the liquid fuel accumulation chamber and the floor is formed to include at least one drain port to drain liquid fuel from the liquid fuel accumulation chamber to a destination below the vent module.

19. The apparatus of claim 13, wherein the outer shell and vent module cooperate to define a liquid fuel accumulation chamber arranged to lie in fluid communication with the fuel vapor transfer passageway to receive liquid fuel droplets present in the fuel vapor transfer passageway.

20. The apparatus of claim 13, wherein the outer shell is formed to include a liquid fuel accumulation chamber arranged to lie in fluid communication with the fuel vapor transfer passageway to receive liquid fuel droplets present in the fuel vapor transfer passageway.

21. The apparatus of claim 13, wherein the fuel vapor transfer port formed in the outer shell is arranged to lie in axially spaced-apart relation to the fuel vapor inlet port formed in the vent module.

22. A fuel tank vent apparatus comprising a vent module adapted to be mounted in an aperture formed in a top wall of a fuel tank, the vent module being formed to include a valve chamber, a fuel vapor inlet port arranged to admit fuel vapor into the valve chamber, and a fuel vapor outlet port arranged to discharge fuel vapor from the valve chamber to a destination outside the vent module, the vent module further including a valve mounted for movement in the chamber between an opened position allowing flow of fuel vapor from the chamber through the fuel vapor outlet port and a closed position blocking flow of fuel vapor from the chamber through the fuel vapor outlet port, and means for moving a flow of fuel vapor in a downward direction along an exterior surface of the vent module in a fuel vapor transfer passageway communicating with the fuel vapor inlet port to cause the flow of fuel vapor to change direction as said flow passes through the fuel vapor inlet port formed in the vent module so that liquid fuel entrained in said flow of fuel vapor moving in the downward direction along the exterior surface of the vent module in the fuel vapor transfer passageway toward the fuel vapor inlet port is shed as fuel vapor passes laterally from the fuel vapor transfer passageway through the fuel vapor inlet port into the chamber to produce liquid fuel droplets falling in the downward direction in the fuel vapor transfer passageway away from the fuel vapor inlet port to produce a flow of demoisturized fuel vapor passing into the chamber through the fuel vapor inlet port.

23. A fuel tank vent apparatus comprising a valve housing including a cylinder-shaped inner sleeve formed to include a chamber and a horizontal plate formed to include a fuel vapor outlet port arranged to discharge fuel vapor extant in the chamber, and a cylinder-shaped outer sleeve coupled to the horizontal plate and arranged to surround the cylinder-shaped inner sleeve to define an annular fuel vapor transfer passageway therebetween, the cylinder-shaped outer sleeve being formed to include a fuel vapor transfer port located a first distance from and below the horizontal plate to admit fuel vapor from a region outside the cylinder-shaped outer sleeve into the fuel vapor transfer passageway, the cylinder-shaped inner sleeve being formed to include a fuel vapor inlet port located a greater second distance from and below the horizontal plate to admit fuel vapor moving through the fuel vapor transfer passageway in to the chamber through the fuel vapor inlet port.

* * * * *

UNITED STATES PATENT AND TRADEMARK OFFICE
CERTIFICATE OF CORRECTION

PATENT NO. : 6,578,597 B2
DATED : June 17, 2003
INVENTOR(S) : J. Bradley Groom and Dennis M. DeCapua It is certified that error appears in the above-identified patent and that said Letters Patent is hereby corrected as shown below:

Title page,
Item [56], References Cited, U.S. PATENT DOCUMENTS, please insert the following references:

|  |  |  |
|---|---|---|
| -- 6,035,884 | 3/2000 | King et al. |
| 5,694,968 | 12/1997 | DeVall et al. |
| 5,535,772 | 7/1996 | Roetker et al. |
| 5,449,029 | 9/1995 | Harris |
| 5,566,705 | 10/1996 | Harris |
| 5,518,018 | 5/1996 | Roetker |
| 4,966,189 | 10/1990 | Harris |
| 4,836,835 | 6/1989 | Harris et al. |
| 4,944,779 | 7/1990 | Szlaga et al. |
| 4,790,349 | 12/1988 | Harris -- |

Signed and Sealed this

Third Day of August, 2004

JON W. DUDAS
*Acting Director of the United States Patent and Trademark Office*